(12) United States Patent
Sleeper

(10) Patent No.: X4583
(45) Date of Patent: Nov. 22, 1826

(54) UMBRELLA & PARASOL, MANUFACT

(76) Inventor: William Sleeper

William Sleeper.
Letters Patent. (Dated, No. 22. 1826)
The Schedule referred to in these Letters Patents, and making part of the same, containing a description in the words of the said William Sleeper himself of his Improvements in the Umbrella and Parasol.

First improvements. — The spring or catch, as commonly used, in the staff or handle to support the frame or ribs, whilst distended, is dispensed with, and there is substituted one or more iron bars or wires, or other material, perpendicularly attached to, or connected with the upper end or head of the frame, so as to stay or confine the umbrella runner, without either catch or spring, and supporting the stretchers at such an angle as to expand the frame or ribs which renders the spring before mentioned unnecessary; by which means the staff, or handle can at any time be detached or separated from the frame by a screw or otherwise at the head or top of the frame, without detriment or difficulty; so as to leave the staff or handle complete in itself, and may be used as a walking cane, &c.

Second Improvements. The stretchers and runner inverted in their operation, so that, in expanding or raising the umbrella or parasol, the runner moves from the top downwards or towards the hand; whereas in the ordinary method, the runner moves upwards or from the hand; by which improvement the frame may remain distended when the handle or staff is separated from it; for the convenience of drying. &c. Consequently, when the frame or ribs fall, the runner or stretchers move upwards, or from the hand; so that when the umbrella is quite down, the stretchers lie on the runner, so as to admit of the stretcher being as long as from the notch piece to the joint or hinge in the bone or rib, or half the length of the whole bone or rib, and so as to remain when folded . . half the length of the original bone or rib, and may be conveniently packed in a case or otherwise, separate from the staff or handle, for the accommo= dation of travellers, or others.

Third Improvement. As regards the hinge or joints in the rib, by supplying a plate or guard, the under side of the joints, in order to confine the tongue, more steadily in its proper place.

Witnesses.
James Wiley.
Charles Murphy.

William Sleeper.

Exd W.G.C.

(408 words)

---

David G. Dunham a Citizen of the United States Letters Patent dated December twentieth. 1824.

The Schedule referred to in these Letters Patent, and making part of the same, containing a description in the words of the said David G. Dunham himself of his improvement in the Washing Machine.

The essential principle of this improvement in the Washing Machine consists of the use of balls in a square or other angled box, wherein the clothes and suds are placed which being turned by means of a hand crank or other fixture, causes the requisite friction of the balls against the clothes for cleansing them.

The balls are best made of Stone, and their form before covering may be square or otherwise irregular, they are to be then well inclosed in a strong bag made of Sheeting or other substantial 2—328 a.

DRAFTSMAN'S DIVISION.

*All communications should be addressed to*
"The Commissioner of Patents.
Washington, D. C."

*DEPARTMENT OF THE INTERIOR,*

United States Patent Office,

*Washington, D. C.,* ............ *, 189*...

*SIR:*

*The printed* copies *of Patent No.* W Sleeper Nov 22 1826
are *exhausted.*

*As soon as printed a copy will be mailed you to complete your order.*

*By direction of the Commissioner:*

*Very respectfully,*

............................................
*Chief Clerk.*

81436-97-5m